United States Patent [19]
Daddario

[11] 4,174,192
[45] Nov. 13, 1979

[54] TIDE OPERATED PUMPS

[76] Inventor: Francis E. Daddario, 15 Fowler La., Falmouth, Mass. 02450

[21] Appl. No.: 861,685

[22] Filed: Dec. 19, 1977

[51] Int. Cl.² .................. F04B 17/00; F04B 35/00
[52] U.S. Cl. .................................. 417/333; 60/496; 60/505
[58] Field of Search ............ 417/337, 331, 333, 330; 60/496, 497, 505

[56] References Cited

U.S. PATENT DOCUMENTS

| | | | |
|---|---|---|---|
| 961,401 | 6/1910 | Bonney | 417/331 |
| 1,677,431 | 7/1928 | Coneliussen | 60/505 X |
| 3,690,790 | 9/1972 | Hooper | 417/331 X |

*Primary Examiner*—William L. Freeh
*Assistant Examiner*—Richard E. Gluck

[57] ABSTRACT

A tide operated pump has piston and cylinder members establishing a vertically expansible chamber, one member fixed and the other including a float that is adapted to contain ballast water. Valve controlled inlet and outlet conduits enable the chamber to become expanded and charged with water as a tide rises, the water trapped therein until the tide has ebbed to a wanted extent and then released under the head established by the float. The float may be flooded when in an elevated position to further increase the head and the ballast water later drained to restore normal float buoyancy if desired. A series of such pumps provide a continuous flow and the pumps are interconnected in a manner permitting one or more of the pumps to expand the chamber of at least one of the pumps with its float substantially above the height established at high tide to further increase the pumping capacity of that pump.

17 Claims, 8 Drawing Figures

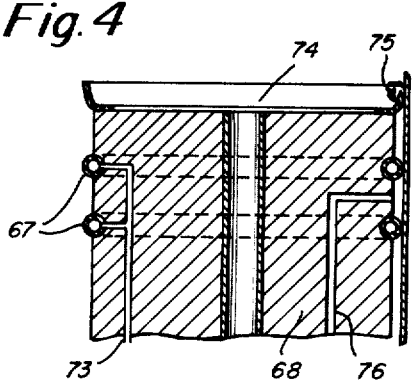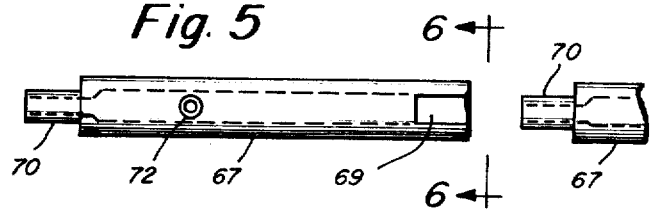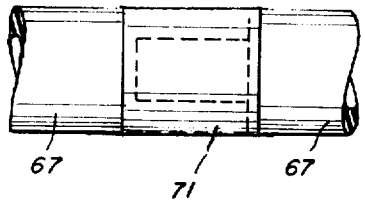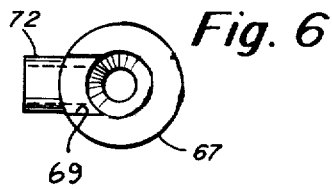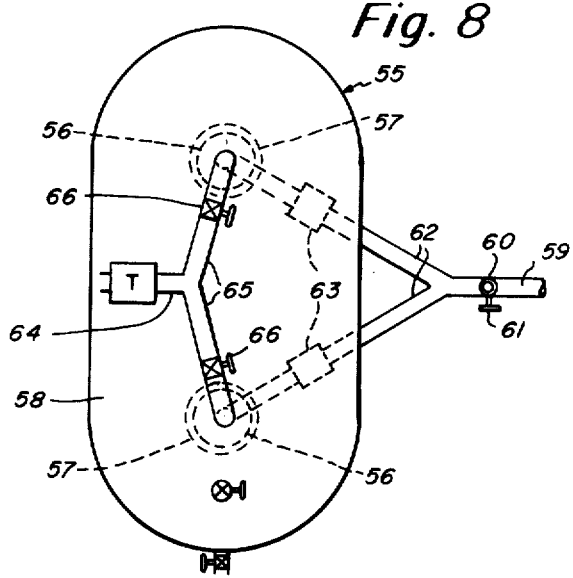

TIDE OPERATED PUMPS

RELATED APPLICATION

An application filed on the same date as this application and entitled "Pumps Operated By the Rise and Fall of Water," said application Ser. No. 861,686.

BACKGROUND OF THE INVENTION

Many proposals have been made to utilize waves and tides to operate pumps with the latter having the advantage that with an appropriately sized piston fixed vertically on the ocean bottom and a cylinder receiving the piston and supported by a float, a large volume of water could be pumped with each tide but with the disadvantage that at high and low tides, the puming action would be at a standstill and that the discharge as a tide ebbed, would be slow.

The former drawback was overcome by proposing to utilize such tide operated pumps to supply a reservoir of a capacity adequate to operate a turbine on a continuous basis, see U.S. Pat. No. 3,690,790, while the latter disadvantage was solved by proposing that the discharge of the pump be under the control of a valve or gate that was to be closed to prevent the float from settling with the tide and to be opened when the tide ebbed to provide the rapid discharge of the water slowly drawn in with the tide with the weight of the float providing the necessary substantial head, see U.S. Pat. No. 1,665,140.

While floats have been proposed that could have water admitted into their interiors to effect their water line, see U.S. Pat. Nos. 3,690,790, 879,992, and 961,401, so far as I am aware, no tide operated pump has had its float adapted to receive ballast water at or near the end of the intake stroke in order to increase the head and, at or near the end of the discharge stroke, permit the ballast water to be drained in order to restore the normal buoyancy of the float.

THE PRESENT INVENTION

The general objective of the present invention is to provide pumps and combinations of pumps with the pumps operated by the rise and fall of the tide, an objective attained with each pump having piston and cylinder members establishing a vertically expansible chamber, one member fixed and the other member including a float that can contain ballast water. Valve controlled inlet and outlet conduits enable the chamber to become charged with water at high tide, the water therein trapped until the tide has ebbed to a wanted extent, and the chamber water then discharged under the head established by the float on the entrapped water. The float may be flooded in an elevated position further to increase the head and later drained to restore normal float buoyancy.

Another object of the invention is to provide a tide operated system where continuous operation is wanted as in the case of a hydroelectric system, an objective attained with a series of at least two pumps and these may be of the same or different sizes but all of the above type. The combined capacities of the several pumps, the rate and timing of their operation and the fact that the floats may be sunk, when flooded with ballast water, regardless of the tide, make it possible to operate a turbine or turbines continuously throughout tide cycles.

Another objective of the invention is to provide pumps for such a system that are not limited in their operation by tide levels, an objective attained by providing piston and cylinder members that establish chambers that can be vertically expanded to an extent greater than that resulting at a maximum high tide, and by so interconnecting the pump chambers that by increasing the head on the chamber water in one pump to an extent greater than that on the chamber water of another pump, the water discharged from the first named pump is operable to effect such further expansion. The second named pump may be the main pump of a system or each pump of a series may be operated by itself or with another pump or pumps to provide a discharge stream of a wanted volume, head, or both.

Yet another objective of the invention is to provide pumps for use where tide heights are insufficient to provide wanted chamber expansion, an objective attained with each pump within a compartment having a valve controlled port and with a valve controlled conduit operable to effect inter-pump communication between the pump chambers, the chambers established by the compartments, or both. The conduits of each pump also extend outside the compartments for receiving outside water. Desirably, each pump is either operable to effect turbine operation by itself or in conjunction with another pump. With suitable valves, the conduit by which a pump receives water may also be used for discharge purposes and be provided with a turbine. Turbines may also be operated by water drawn into the pump chambers.

Other objectives of the invention and other of its novel features and advantages will be apparent from the following specification and appended claims.

BRIEF DESCRIPTION OF THE DRAWINGS

In the accompanying drawings, there are shown illustrative embodiments of the invention

FIG. 4 is a fragmentary, vertical section on an increase in scale, through one of the pump pistons and its seals;

FIG. 5 is an elevational view of one of the seals;

FIG. 6 is an end view, on an increase in scale, taken substantially along the indicated line 6—6 of FIG. 5;

FIG. 7 is a fragmentary side elevation of a completed joint between said sections; and FIG. 8 is a plan view of a pump in accordance with another embodiment of the invention.

THE PREFERRED EMBODIMENTS OF THE INVENTION

Figure 1:
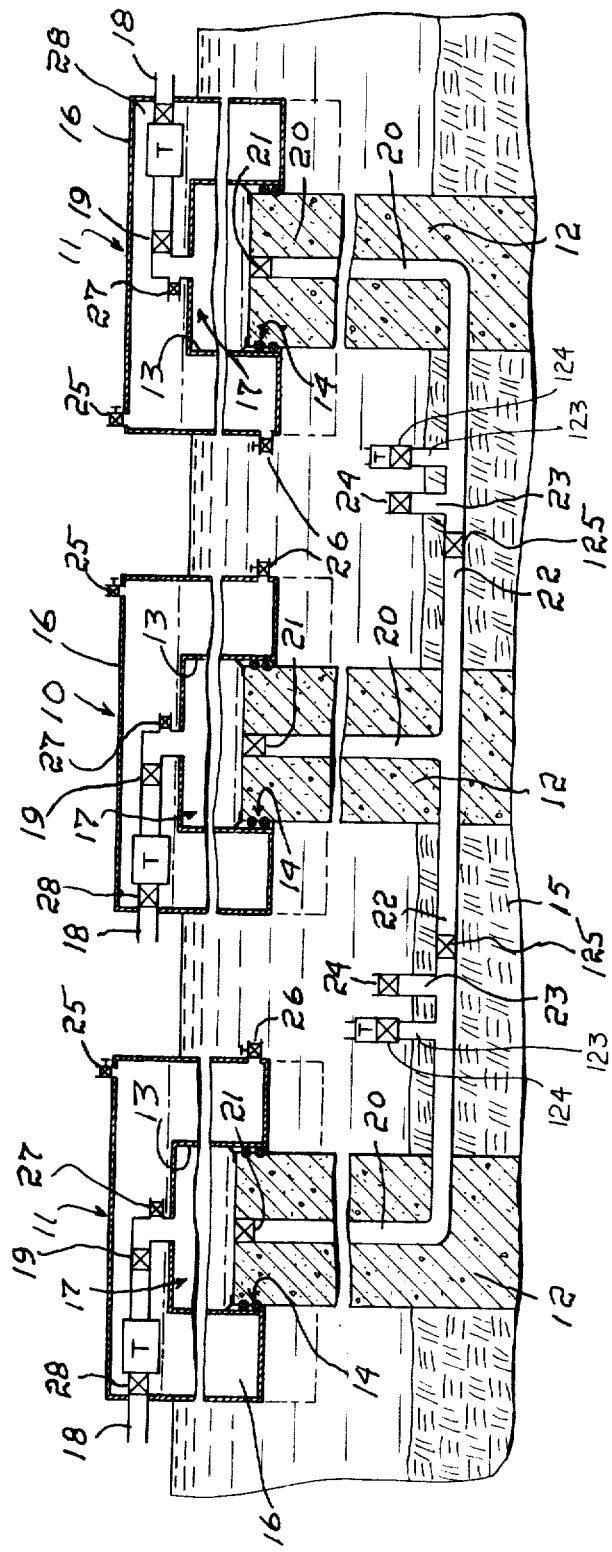
FIG. 1 is a somewhat schematic arrangement in accordance with the invention utilizing tide operated pumps of a hydroelectric system.

In the embodiment of the invention schematically illustrated by FIGS. 1 and 2, a tide operated hydroelectric system includes a series of pumps of which one, the pump 10, may be a main pump and the others, the pumps 11 supply or satellite pumps but which, as will later be explained, can be operated individually or in other combinations. As the pumps 10 and 11 are or may be the same except that the pump 10 may be the largest, the same reference numerals are employed to designate corresponding parts.

Each pump includes a piston member 12 slidably receiving a cylinder member 13 and provided with sealing means generally indicated at 14, the piston member 12 fixed on the ocean bottom 15 or in an excavation adjacent the ocean and in communication therewith and the cylinder member 13 provided with a float 16. The piston member holds the float 16 against lateral movement and it and the cylinder member and the float may be of any desired cross sectional size and shape. The members 12 and 13 establish a vertically expansible chamber indicated generally at 17 and the lowermost position of the float can be established by using the piston member as a stop, by providing stops on the ocean bottom or by having it supported by the water at low tide levels.

A discharge conduit 18 is in communication with the chamber 17 shown as extending through the side of the upper part of the float 16 and as including a valve 19 and turbine T within the float. A conduit 20 extending upwardly through the piston member 12 is also in communication with the chamber 17 and includes a valve 21.

The conduit 20 of each pump 11 is connected to the piston conduit 20 of the pump 10 by a conduit 22 having an inlet 23 below the low tide level and provided with a valve 24 which, when open, enables water to be drawn through either or both interconnected conduits 20 and into the chambers 17 as the tide lifts the floats if the associated valve or valves 21 are open. The valve 21 of each pump is operable to block the discharge of water from the associated chamber 17 thus enabling an elevated float to be held against descending as the tide ebbs and isolated against the action of any other pump. It is preferred, for most purposes that the piston and cylinder of each pump be so dimensioned that its chamber can be expanded beyond the extent effected by the maximum high tide level.

Because of the valve arrangements, the chamber 17 of any pump 11 may be placed in communication with the chamber 17 of the pump 10 with the appropriate valves 21 open, with the valve 19 of that pump 11 closed and the valve 24 of the interconnecting conduit 22 closed. With any other pump 11 having its associated valves similarly set and with the valve 21 of the pump 10 closed, one or more pumps 11 may discharge water into the chamber of another pump 11 provided an appropriate head differential exists, then to raise the float 16 thereof if the valve 19 of that pump is closed or to operate its turbine T if that valve is open or both functions can be carried out at the same time if two or more pumps 11 are thus used.

In addition it will be noted that the floats 16 are essentially ballast tanks. Each float 16 has an air relief port provided with a valve 25 and a port provided with a valve 26 below the normal water line and desirably located to be above the low tide level when the float is in its lowermost position resting on a piston member 12 or other support thereby to make it unnecessary to raise a float of one pump by chamber water discharged for another pump if full drainage is wanted although drainage in that manner can be thus effected at any tide level so that the valve 26 could be located below the normal water level. The floats 16 can thus be filled with ballast water when they are at least partly elevated and later drained to restore their normal buoyancy.

Ballast water may be introduced into a float 16 in other ways. Each conduit 18 has a valve 27 enabling ballast water to be delivered from the chamber 17 with the valve 27 controlled to prevent the ballast water from prematurely overcoming the float lifting forces. In addition, the conduit 18 is shown as provided with a valve 28 operable in one position to effect the discharge of water from the turbine T outside the float and in another position to effect the delivery of at least part of such water into the float 16 as ballast water. Such water may be received through a conduit 22 from another pump.

It will be appreciated that the invention contemplates floats and piston and cylinder members of substantial dimensions in order that a pumping system in accordance therewith may have the same or greater potential than existing hydroelectric systems that may require the flooding of valuable land for an adequate reservoir. In addition, the pumps may be located close to the areas to be served thus shortening transmission lines.

The combined volumetric capacity of the pumps 10 and 11 and their rates of discharge are such as to ensure the continuous operation of the turbine T throughout an entire tide cycle once the system is in operation.

By way of illustration of one mode of operation, assume a start-up at low tide with all the valves 21 and 24 open and the valves 19 and 27 closed so that water is drawn into the pump chambers as the tide rises. At high tide, the chambers 17 of the pumps are expanded and charged but capable of being further expanded and further charged. The valves 24 are then closed to make possible the discharge of water from one or more pump 11 into the pump chamber 17 of any other pump if desired, that of the pump 10 for example. The system may also be operated by increasing the heads on the pump chambers 17 during subsequent tides by pumping from one pump 11 to another.

In order not to limit the rate of water flow to any turbine T to the rate at which the tide ebbs, the valves 21 are also closed thus holding the floats 16 elevated. When the tide has ebbed to a predetermined extent the valves 21 are opened in desired order and at appropriate times to discharge water from the pumps 11 into the pump chamber 17 of the pump 10 further expanding that chamber and further elevating the float 16 of the pump 10 and discharging through the conduit 18 to operate the turbine T when the valve 19 of that pump is open. In order to ensure an adequte head, the float 16 of any pump may be flooded with ballast water at high tide or at any lesser elevated position with the flooded tank operable, if the associated valve 21 is open, to cause the float to sink. Flooding can be effected in any manner as above described.

As the combined volumetric capacity of the pumps 10 and 11 and their rates of discharge are determined as that required to operate the turbine T of the pump 10 continuously at its maximum rate, the capacity of the chamber 17 of the pump 10 when fully expanded is or may be that adequate to ensure such operation throughout all or any wanted part of an incoming tide. As the pumps 11 are discharging through the pump 10, the float 16 of the pump 10 remains elevated until the delivery from the pumps 11 drops off, the float 16 of the pump 10 then starting to descend thus permitting the pumping action to be continuous. Additionally, one or more float 16 can be so elevated that enough chamber expansion is effected to prevent such a drop off.

It will be appreciated that any float 16 may be raised further by loading the ballast tank of any of the other pumps with the resulting increased head ensuring delivery of water into the chamber of a pump of a lesser head or into its float 16 as ballast water.

Figure 2:
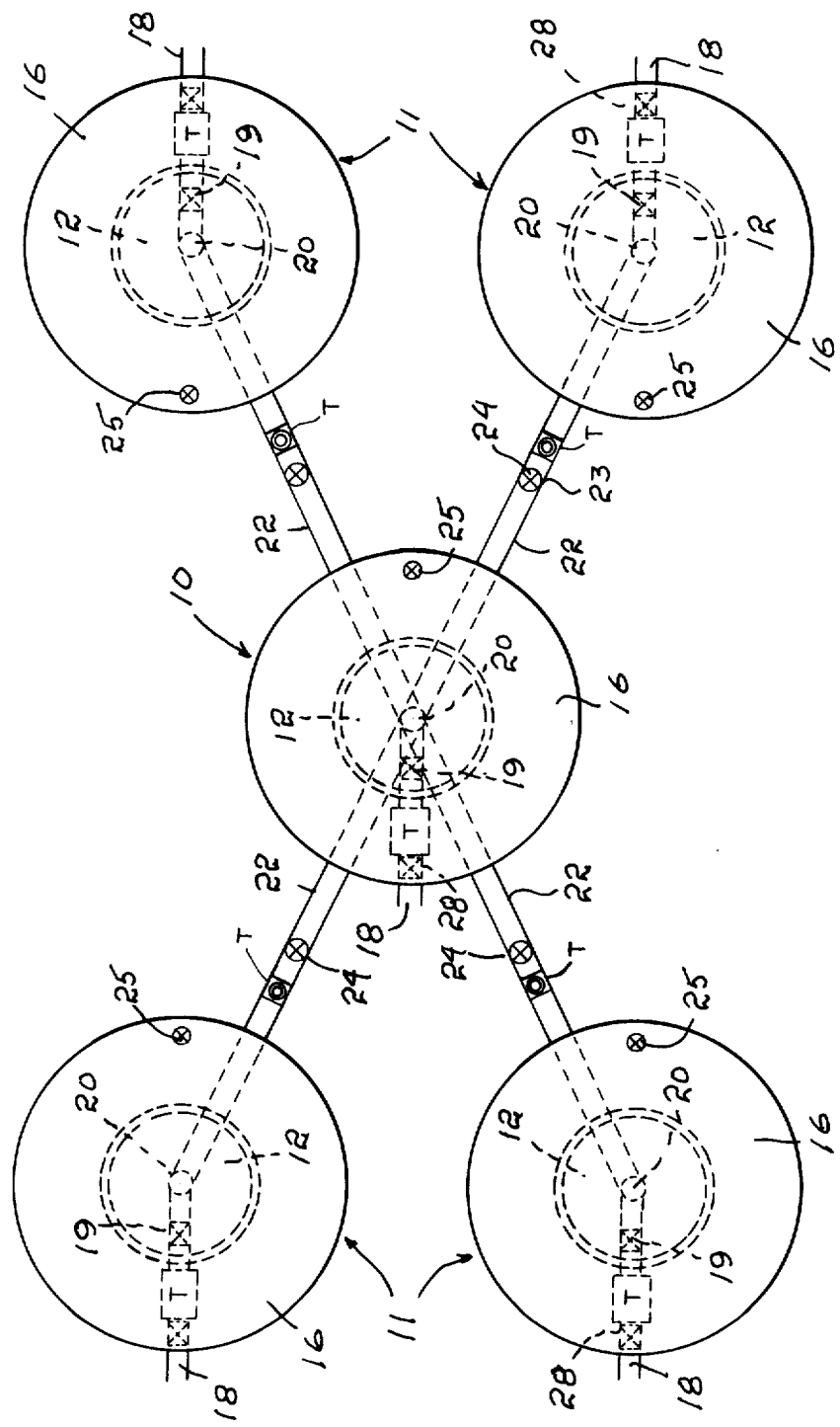
FIG. 2 is a plan view thereof.

In addition, a hydroelectric system in accordance with the invention and as shown in FIGS. 1 and 2, may have its conduits 22 provided with inlets 123 provided with a valve 124 and a turbine T below low tide level. The inlets 123 are dimensioned to provide a restricted flow providing, as the tide rises, a turbine operating stream of adequate velocity. The valves 24 may be employed, when the inlets 123 are in use, in a manner ensuring the filling of the chambers 17 at high tide. The turbines T with which the inlets 123 are provided may be two way turbines. Valves 125 enable the pumps to be isolated one from another.

Figure 3:
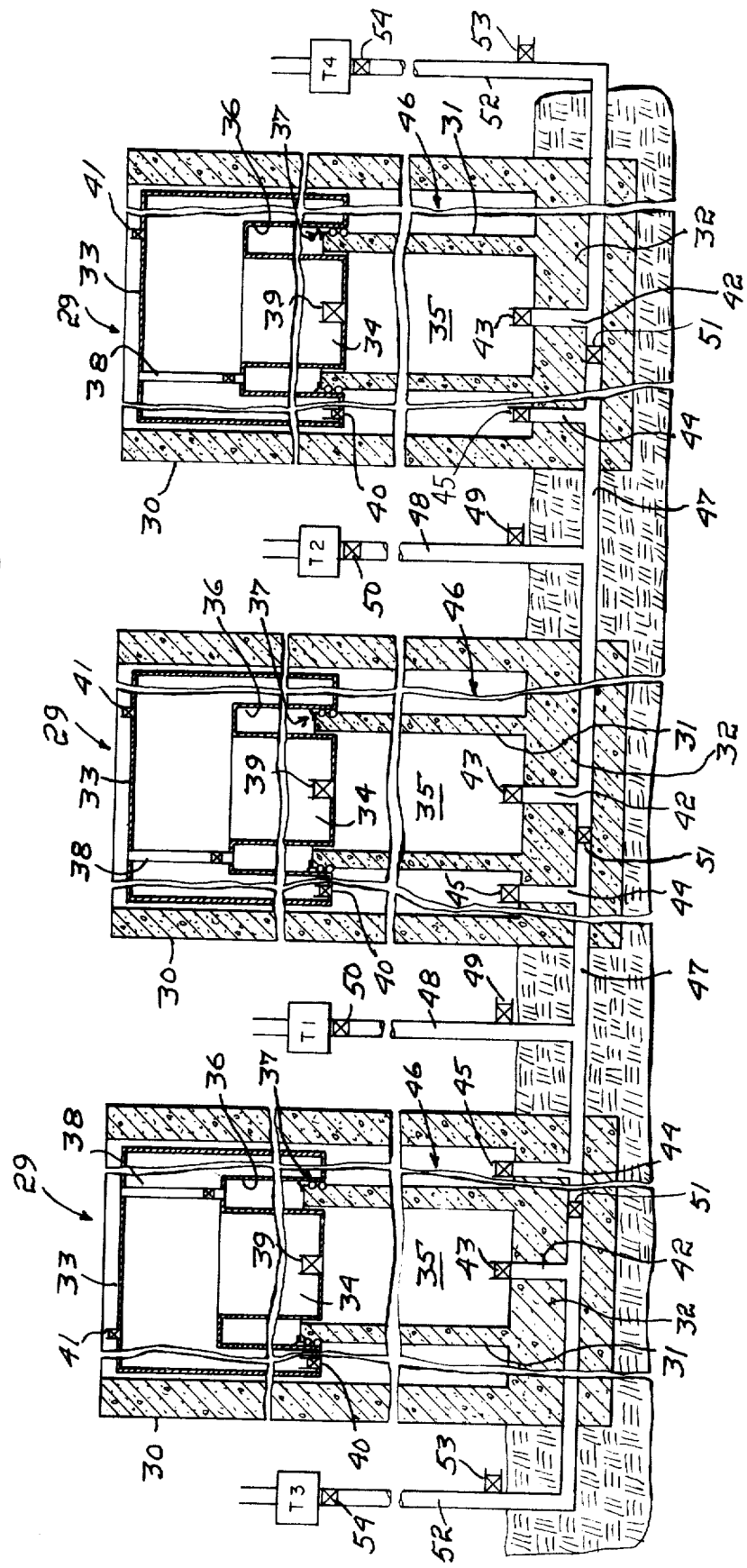
FIG. 3 is a view similar to FIG. 1 of a hydroelectric system in accordance with another embodiment of the invention.

The embodiment of the invention illustrated by FIG. 3, while generally similar to the previously described embodiment, for convenience, the pumping system is shown as consisting of but three pumps, generally indicated at 29.

Each pump 29 is within an upwardly opening compartment 30 erected on the ocean bottom. The compartment 30, while shown as spaced apart, may be interconnected. Each pump 29 has an upwardly opening cylinder 31 fixed on the bottom 32 of its compartment and it may be of any desired cross sectional shape. The dimensions of each compartment 30 relative to those of the cylinder 31 therein are such as to ensure that sufficient water may be pumped therein to raise the associated float 33 to a desired extent above the height established at high tide.

The float 33 of each pump 29 has a piston 34 dimensioned for entry into the cylinder 31 and defining therewith a vertically expansible chamber generally indicated at 35. The height of the compartments 30 and the vertical dimensions of the cylinders 31 and pistons 34 are such that the chamber 35 can be expanded substantially beyond the extent to which their expansion is effected by tides. The float 33 has a downwardly opening cylinder portion 36 spaced from the piston 34 a distance such as to accommodate the wall of the cylinder 31 which is shown as provided with sealing means 37. Valve controlled air venting means 38 are in communication with the space between the piston 34 and the cylinder portion 36.

The float 33 of each pump 29 has ports by which it may be flooded with ballast water and later drained, one port in the bottom of the piston 34 and provided with a valve 39 and another in the bottom of the cylindrical portion 36 and provided with a valve 40. Each float has an air port under the control of a valve 41.

A conduit 42 provided with a valve 43 opens into each cylinder 31 through the compartment bottom 32 and a conduit 44 provided with a valve 45 opens through the compartment bottom 32 into the chamber, generally indicated at 46, defined by the wall of the cylinder 31 and that of the compartment 30. The conduits 42 and 44 of each pump 29 are connected to the conduits 42 and 44 of another pump 29 by means of a conduit 47 and a typical and preferred pump arrangement is to have one pump between two other pumps so that the chambers 35 of any pump may be placed in communication with either or both of the chambers of another pump via one or more of the conduits 47. Each conduit 47 has an upwardly disposed conduit 48 outside any compartment 30 and common to the two or more pumps it may directly connect, having a port below low tide level and provided with a valve 49 and above the valve 49 a valve 50 and a turbine T. In addition, each conduit 47 has a valve 51 between the conduits 42 and 44 of each pump 29. In the case of the end or outer pump 29 an upwardly disposed conduit 52 is provided at its outer end in communication with the proximate chamber 46 and, like the conduits 48, outside any compartment 30 and provided with an inlet below low tide level and provided with a valve 53, an upper valve 54 and a turbine T.

Each pump 29 may be operated, with a start up at low tide, by opening the associated valves 43, 45, 49, 51, and 53 and all other valves closed. With the valves 49 and 53 closed, (the valves 50 and 54 could also be opened if the turbines were below low water level). As the tide rises, the chambers 35 and 46 are filled to the extent the float 33 is elevated at high tide. The valves 43, 45, 49, and 53 are then closed to trap the water in the chambers 35 and 46. When the tide has ebbed at least partly, the water in any or all chambers 46 may then be drained by opening the valves 54 and 49 or the valves 45 and 50 if the position of the associated turbine is such as to enable it to be operated by the draining water. The water in the chamber 35 is now under greater pressure as the float 33 is supported only by the entrapped chamber water. With the valve 43 opened, and the valves 49 and 53 closed water may be discharged to operate a turbine through an associated conduit 48 or 52. If desired, the weight of the float 33 can be increased before the chamber 46 is drained by opening the valve 45 to admit ballast water into the float and such ballast water may be later drained, preferably by opening the valves 39 and 40 when the chambers 35 and 46 are drained. In this mode of operation, all of the pumps 29 are operating simultaneously.

One pump 29 may be constructed to have a greater head on the water entrapped in its chamber 35. The system can be operated on a continuous basis without regard to tides as the pump chambers 35 and 46 can be expanded with their floats 33 raised a substantial distance above high tide levels and with their combined volumetric capacities more than enough to ensure turbine operation through a tide cycle with the appropriate regulation of the valves.

Any pump having a greater head on the water in its chamber 35 than exists in the case of another pump may deliver water into the chambers 35 and 46 of the last named pump thus to further expand the chamber 35. By opening the valve 45 of the receiving pump, the float 33 may be flooded to increase the head on the water in the chamber 35 and the addition of such ballast water to the delivering pump to so increase its operating head to permit further elevation of the floats to ensure the wanted capacity and head for continuous turbine operation.

When the valves 43 and 45 of a pumping unit are closed, that pump is inoperative and thus any pumping unit 29 may be operated by itself once its chambers 35 and 46 are charged with water.

By way of one example only, the middle pumping unit can be operated by itself with the associated valve 51 closed by opening the valve 45, the valve 50 in the left hand conduit 48 to operate the turbine therein if below the low tide elevation otherwise to open the valve 49 thus to empty the chamber 46. The valve 43 may then be opened along with the valve 50 of the right hand conduit 48 to operate the turbine thereof.

If the head on the water in the chamber 35 is greater than that on the water in the chambers of the right hand pumping unit 29, the water in the chamber 35 of the middle pumping unit can be delivered through the conduit 44 into the chamber 46 of the right hand unit to raise its float 33 so that with its valve 43 open and the valve 53 of the adjacent conduit 52 then opened, water will be sucked into its chamber 35.

A pump in accordance with another embodiment of the invention is shown in FIG. 8 and is generally indicated at 55 and while its construction may be the same as that of the previously described embodiments, it is shown as of the type described in connection with FIGS. 1 and 3 but having two fixed vertical pistons 56 and two cylinders 57 supported by the float 58 thus providing the pump with two vertically expansible chambers. The conduit 59 effecting communication between the chambers of both pumps has an upwardly opening inlet port 60 below water level and provided with a valve 61 and two branches 62, one for each chamber and opening therein through its piston 56 and provided with a valve 63. The discharge conduit 64 includes a turbine T and two conduits 65, one opening into each chamber through its cylinder 57 and provided with a valve 66.

It will be appreciated that because of the size of the pistons and cylinders, and because of the water pressures attendant pump operation, sealing of the pumps is a problem, which is not, however, the concern of the present invention. The sealing means indicated generally at 14 in FIG. 1 and at 37 in FIG. 3 is shown in FIGS. 4–7 as including seals 67 of circular section carried by the fixed member 68 and shown as of an inflatable type but which may be solid. Each seal 67 is formed from a number of sections each having at one end a slotted socket 69 and the other end is provided with an axial extension 70 dimensioned to fit thereon and sealed by the wrapper 71. Each seal section may be inflated via a port 72 connected by a conduit 73 to a source (not shown) of fluid under pressure which may be air or water. The fixed chamber defining member of the pump has a valve element 74 secured to its upper end and upwardly and outwardly inclined with a cylindrical and desirably reinforced portion 75 slidably engaging the wall of the associated cylinder defining member and sufficiently flexible to respond to the pressure within the chamber to render such engagement an effective seal. In addition, fluid under pressure may be introduced between the seals 67 via a conduit 76 from a suitable source.

Service ports and other assembly details are not shown as such are a matter of choice and would unnecessarily complicate the drawings. Means to operate the valves are not shown as not part of the present invention but such are to be operated on a remotely controlled and preferably a programmed basis.

I claim:

1. A tide operated hydroelectric system including a series of pumps, each pump including at least one piston member and a cylinder member defining therewith a vertically expansible chamber, one member fixed on the ocean bottom and the other including a float, operating means including conduits in communication with said chambers and control valves for said conduits, said conduits and valves arranged to provide a water inlet at low tide for each pump with the chambers filling as the tide lifts the floats, the entrapment of water in each chamber and its subsequent discharge therefrom under a wanted head, said operating means including at least one turbine operable by the discharge from one pump chamber, said operating means also including means operable to enable water discharged from another pump to be under a head adequate to operate said one pump independently of the tide level, and at least some of said floats including valve controlled means operable to admit ballast water therein when in an elevated position in order to increase the head on the chamber water and to be later drained to restore normal float buoyancy.

2. The tide operated hydroelectric system of claim 1 in which the water inlet of at least one pump includes a turbine operable by water flowing therethrough to the chamber thereof.

3. The tide operated hydroelectric system of claim 1 in which the operating means enables at least one pump to be operated as a suction pump.

4. The tide operated hydroelectric system of claim 3 in which the inlet for said suction pump includes a turbine.

5. The tide operated hydroelectric system of claim 1 in which the fixed member is a piston.

6. The tide operated hydroelectric system of claim 1 in which the fixed member is a cylinder.

7. The tide operated hydroelectric system of claim 1 in which the series of pumps includes at least three pumps arranged in a row and the operating means includes interconnecting conduits, each operable to effect communication between the chamber of one of the pumps at an end of the row and the chamber of the middle pump and the other interconnecting conduit and valves in control of said interconnecting conduits enabling any of the associated pump chambers to be isolated from the others.

8. The tide operated hydroelectric system of claim 7 in which each interconnecting conduit includes a valve controlled inlet below low tide level.

9. The tide operated hydroelectric system of claim 7 in which the turbine is operated by the discharge chamber water from the middle pump.

10. The tide operated hydroelectric system of claim 7 in which there is a separate turbine for each pump and operable by the discharge of the chamber water therefrom.

11. The tide operated hydroelectric system of claim 1 in which the capacity of at least one of the floats that receives ballast water is such as to enable that float to be sunk from any tide-elevated position.

12. The hydroelectric system of claim 1 in which the means to admit ballast water into floats is a valve controlled port below the normal water line of the float and means to support the float at low tide with the port positioned to enable the ballast water to be drained.

13. The hydroelectric system of claim 12 in which the turbine is carried by the float, the operating means includes a conduit provided with a valve and extending through the float and effecting communication between the chamber and the turbine, and said conduit includes a valve controlled port disposed to enable ballast water to be discharged inside the float.

14. The hydroelectric system of claim 13 in which the turbine includes a discharge and the discharge includes control means operable either to discharge water from the turbine inside or outside the float.

15. The tide operated hydroelectric system of claim 1 in which the chambers of at least some of the pumps can be expanded vertically to an extent greater than that established at high tides.

16. The tide operated hydroelectric system of claim 15 and vertical compartments fixed on the ocean bottom, each pump within one of said compartments, each compartment of a height greater than high tide levels, and the operating means include conduits and valves enabling outside water to enter said compartments as the tide rises and the water trapped therein at high tide and later discharged and water to be delivered from at least one pump chamber into the compartment of another pump.

17. The tide operated hydroelectric system of claim 16 in which the operating means includes means to deliver water discharged from a compartment to said turbine.

* * * * *